United States Patent
Iwamoto et al.

(10) Patent No.: US 12,129,115 B2
(45) Date of Patent: Oct. 29, 2024

(54) TRANSPORT SYSTEM AND TRANSPORT METHOD

(71) Applicant: TOYOTA JIDOSHA KABUSHIKI KAISHA, Toyota (JP)

(72) Inventors: Kunihiro Iwamoto, Nagakute (JP); Yutaro Takagi, Tokyo (JP); Yuta Itozawa, Nagoya (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 540 days.

(21) Appl. No.: 17/648,343

(22) Filed: Jan. 19, 2022

(65) Prior Publication Data

US 2022/0258974 A1    Aug. 18, 2022

(30) Foreign Application Priority Data

Feb. 16, 2021    (JP) .................................. 2021-022725

(51) Int. Cl.
| | |
|---|---|
| B65G 1/04 | (2006.01) |
| B60P 1/44 | (2006.01) |
| B60P 1/48 | (2006.01) |
| B60P 3/00 | (2006.01) |
| B60R 9/042 | (2006.01) |
| B65G 1/06 | (2006.01) |

(52) U.S. Cl.
CPC .............. *B65G 1/0492* (2013.01); *B60P 1/44* (2013.01); *B60P 1/48* (2013.01); *B60P 3/007* (2013.01); *B60R 9/042* (2013.01); *B65G 1/065* (2013.01)

(58) Field of Classification Search
CPC ......... B65G 1/0492; B65G 1/065; B60P 1/44; B60P 1/48; B60P 3/007; B60R 9/042; B66F 9/063; B66F 9/0755; B66F 9/24; B25J 5/007; B25J 9/1602; B25J 9/1664; B25J 19/00
See application file for complete search history.

(56) References Cited

U.S. PATENT DOCUMENTS

| | | | |
|---|---|---|---|
| 5,211,523 A | 5/1993 | Andrada Galan et al. | |
| 9,120,622 B1 * | 9/2015 | Elazary ..................... | B66F 9/07 |
| 10,793,353 B2 * | 10/2020 | Nakano ..................... | B66F 9/06 |

(Continued)

FOREIGN PATENT DOCUMENTS

| | | |
|---|---|---|
| CA | 1252430 A | 4/1989 |
| CN | 110067423 A | 7/2019 |

(Continued)

*Primary Examiner* — Thomas Randazzo
(74) *Attorney, Agent, or Firm* — SoraIP, Inc.

(57) ABSTRACT

A transport vehicle includes at least one rack, a top plate, an arm attached to the top plate and extendable and retractable in a horizontal direction, a rotation mechanism that changes an extension direction of the arm by rotating the top plate with a vertical direction as a rotation axis, and a control unit that controls operation of the rotation mechanism and the arm. The control unit extends and retracts the arm to pull out an object from the at least one rack or a rack installed outside, rotates the top plate on which the pulled-out object is placed, and extends the arm to store the object in the rack when the object has been pulled out from the at least one rack, and extends the arm to store the object in the at least one rack when the object has been pulled out from the rack.

7 Claims, 18 Drawing Sheets

(56) References Cited

U.S. PATENT DOCUMENTS

| | | | |
|---|---|---|---|
| 11,124,401 B1 * | 9/2021 | Jarvis | G05D 1/0225 |
| 11,361,277 B2 * | 6/2022 | Edwards | B65G 1/0492 |
| 2017/0107056 A1 * | 4/2017 | Kadaba | G07C 5/008 |
| 2018/0305124 A1 | 10/2018 | Guo et al. | |
| 2020/0209865 A1 * | 7/2020 | Jarvis | B66F 9/063 |
| 2020/0216298 A1 | 7/2020 | Gravelle et al. | |
| 2022/0204329 A1 | 6/2022 | Zhan | |

FOREIGN PATENT DOCUMENTS

| | | | | |
|---|---|---|---|---|
| CN | 110167719 A | | 8/2019 | |
| CN | 211056639 U | | 7/2020 | |
| JP | S61-002603 A | | 1/1986 | |
| JP | H04-028700 A | | 1/1992 | |
| JP | 2003341836 A | * | 12/2003 | B65G 1/00 |
| JP | 2015178141 A | | 10/2015 | |
| JP | 2019094197 A | | 6/2019 | |

* cited by examiner

TRANSPORT SYSTEM AND TRANSPORT METHOD

CROSS-REFERENCE TO RELATED APPLICATION

This application claims priority to Japanese Patent Application No. 2021-022725 filed on Feb. 16, 2021, incorporated herein by reference in its entirety.

BACKGROUND

1. Technical Field

The present disclosure relates to a transport system and a transport method.

2. Description of Related Art

Japanese Unexamined Patent Application Publication No. 2019-094197 (JP 2019-094197 A) discloses a transport vehicle including a loading platform, a six-axis movable robot arm, and an accommodating portion and capable of raising and lowering the loading platform.

SUMMARY

According to the technique described in JP 2019-094197 A, the loading platform and the robot arm are separately provided and a large force is required when the robot arm takes out a package from the rack.

The present disclosure has been made to solve such a problem, and an object thereof is to provide a transport system and a transport method that reduce the force required for a robot arm to take out a package from a rack.

A transport system in the present embodiment is a transport system including a transport vehicle that transports an object. The transport vehicle includes at least one rack configured to accommodate the object, a top plate, an arm attached to the top plate and configured to extend and retract in a horizontal direction, a rotation mechanism that changes an extension direction of the arm by rotating the top plate by a predetermined amount with a vertical direction serving as a rotation axis, and a control unit that controls operation of the rotation mechanism and the arm. The control unit extends and retracts the arm to pull out the object from the at least one rack or a rack installed outside, rotates the top plate on which the object that has been pulled out is placed by a predetermined amount, and extends the arm to store the object in the rack installed outside when the object has been pulled out from the at least one rack, and extends the arm to store the object in the at least one rack when the object has been pulled out from the rack installed outside.

A transport method in the present embodiment is a transport method in which a transport vehicle transports an object. The transport vehicle includes at least one rack configured to accommodate the object, a top plate, an arm attached to the top plate and configured to extend and retract in a horizontal direction, and a rotation mechanism that changes an extension direction of the arm by rotating the top plate by a predetermined amount with a vertical direction serving as a rotation axis. The transport method includes a step of extending and retracting the arm to pull out the object from the at least one rack or a rack installed outside; a step of rotating the top plate on which the object that has been pulled out is placed by a predetermined amount; and a step of extending the arm to store the object in the rack installed outside when the object has been pulled out from the at least one rack and extending the arm to store the object in the at least one rack when the object has been pulled out from the rack installed outside.

According to the present disclosure, it is possible to provide a transport system and a transport method that reduce the force required for a robot arm to take out an object from the rack.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, the present disclosure will be described through an embodiment of the disclosure, but the disclosure according to the scope of the claims is not limited to the following embodiment. Moreover, not all of the configurations described in the embodiment are indispensable as means for solving the problem.

A transport system according to the embodiment will be described with reference to the drawings. The transport system according to the embodiment includes a transport vehicle 10. The transport system is a transport system in which the transport vehicle 10 transports an object. The object may be a reusable shipping carton.

The transport system may be provided with a server that controls the travel of the transport vehicle 10, but the transport vehicle 10 may generate a transport route by itself to perform autonomous movement. A system in which the processing is completed in the transport vehicle and that does not include a server can also be included in the transport system according to the embodiment.

Figure 1:
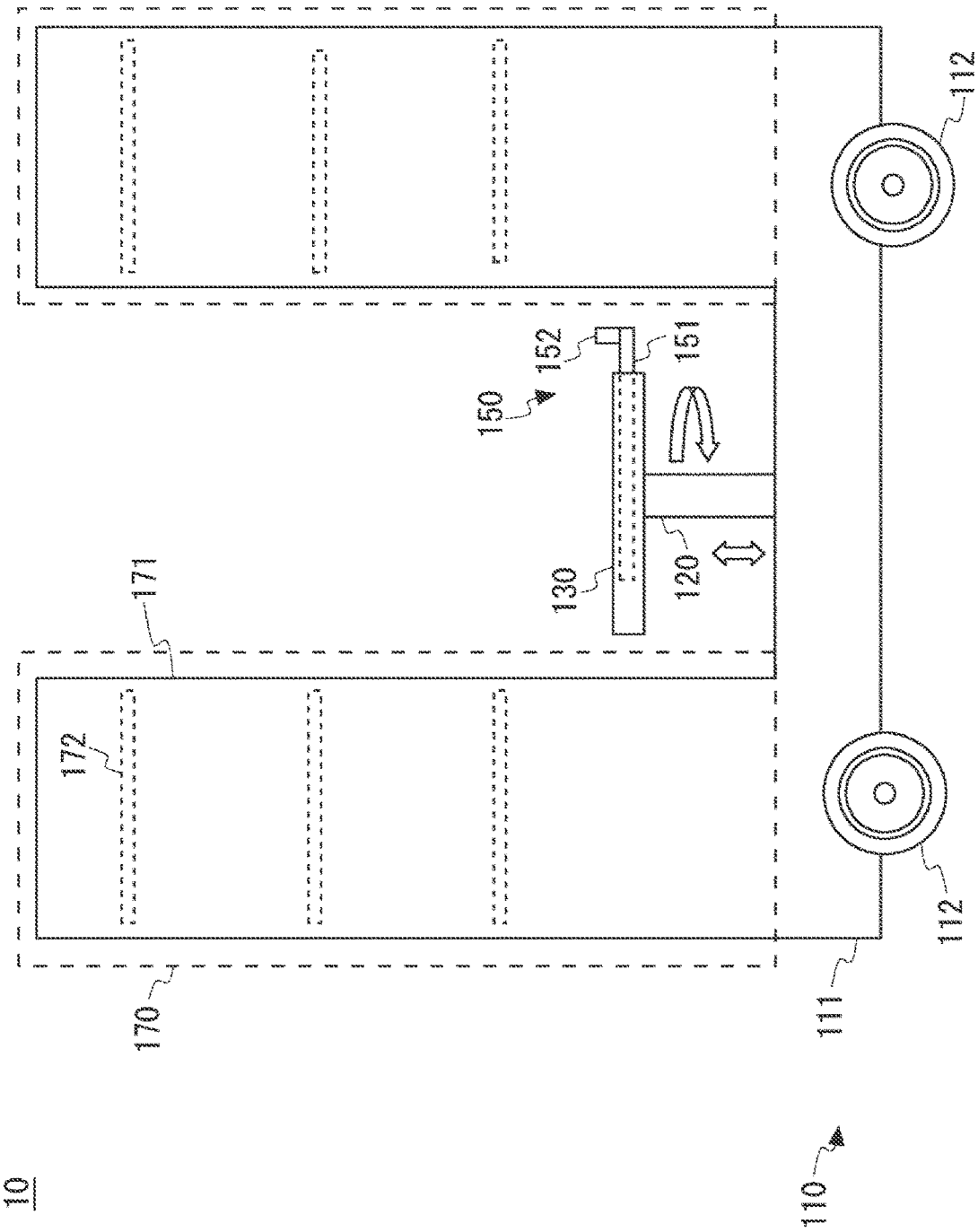
FIG. 1 is a schematic side view showing a configuration of a transport vehicle according to an embodiment.
Figure 2:
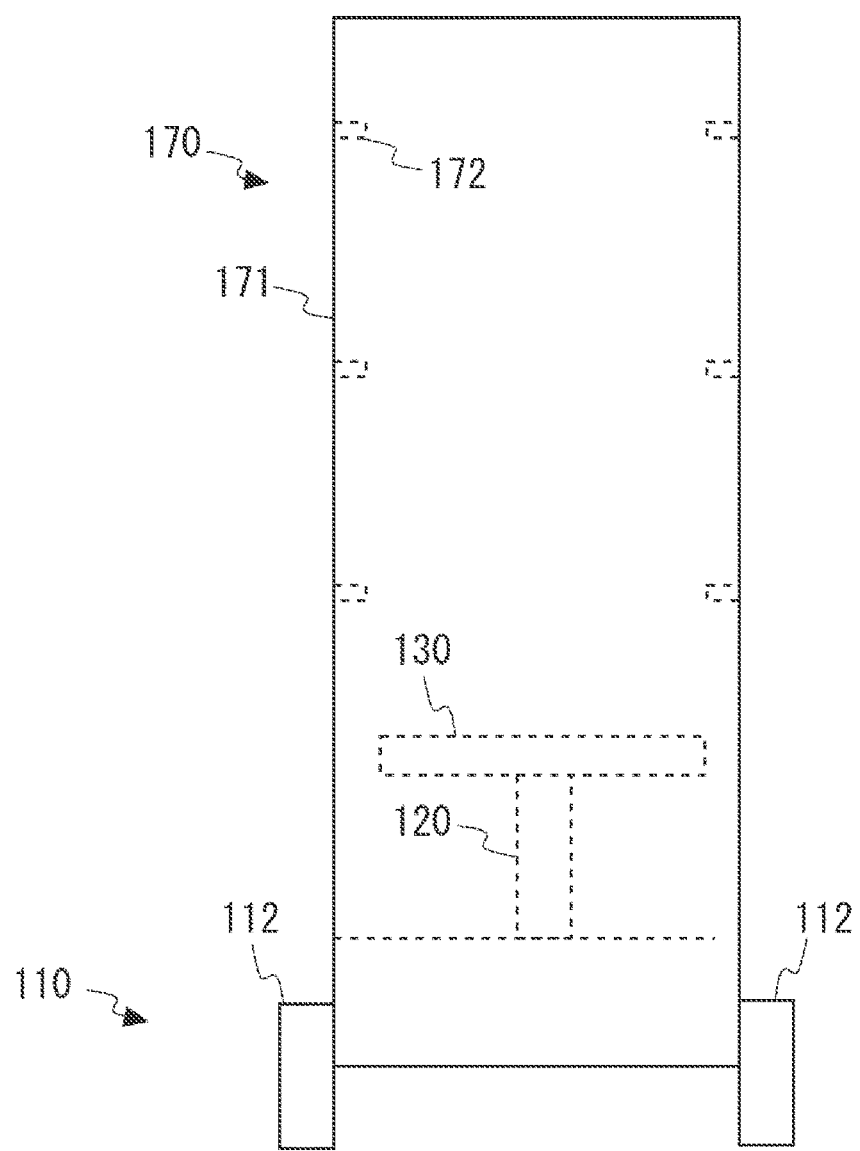
FIG. 2 is a schematic front view showing the configuration of the transport vehicle according to the embodiment.
Figure 3:
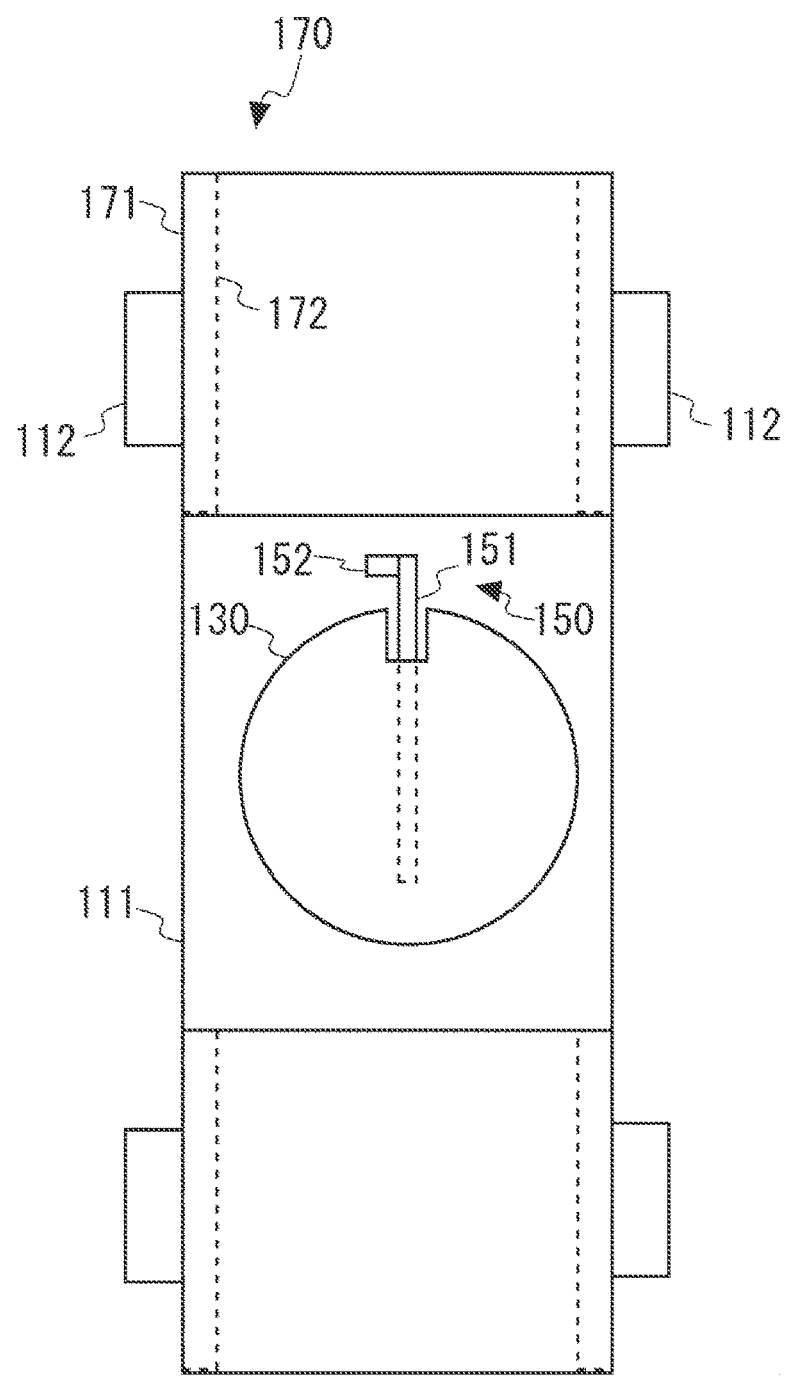
FIG. 3 is a schematic plan view showing the configuration of the transport vehicle according to the embodiment.
Figure 4:
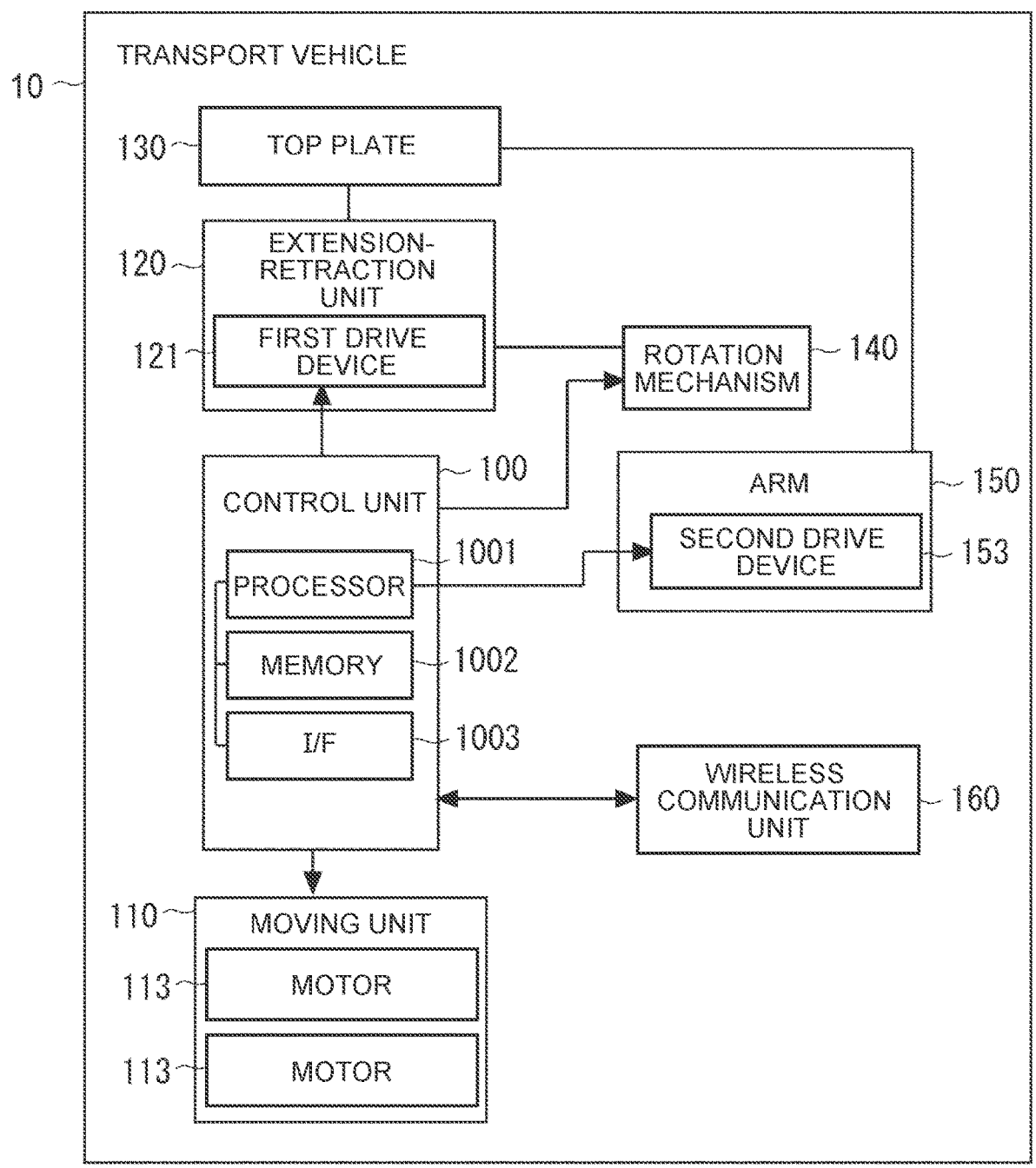
FIG. 4 is a block diagram showing functions of the transport vehicle according to the embodiment.

FIG. 1, FIG. 2 and FIG. 3 are a schematic side view, a schematic plan view, and a schematic plan view, respectively, showing the transport vehicle 10 included in the transport system according to the embodiment. FIG. 4 is a block diagram showing the functions of the transport vehicle 10. The transport vehicle 10 includes a movable moving unit 110, an extension-retraction unit 120, a top plate 130 for supporting a placed object, a rotation mechanism 140, an arm 150, a control unit 100, a wireless communication unit 160, and a rack 170. The control unit 100 performs control of the transport vehicle 10 that includes control of the extension-retraction unit 120, the rotation mechanism 140, and the arm 150.

The moving unit 110 includes a vehicle body 111, a pair of right and left wheels 112 rotatably provided to the vehicle body 111, and a pair of motors 113 that rotationally drives the wheels 112. The motors 113 rotate the wheels 112 via a speed reducer or the like. The motors 113 rotate the wheels 112 in response to a control signal from the control unit 100, thereby enabling forward movement, backward movement, and rotation of the vehicle body 111. With this configuration, the vehicle body 111 can move to a desired position. Note that, the configuration of the moving unit 110 is an example, and the present disclosure is not limited to this. Any configuration can be applied as long as the vehicle body 111 can be moved to a desired position.

The extension-retraction unit 120 extends and retracts in the up-down direction. The extension-retraction unit 120 is also referred to as an elevating mechanism. The extension-retraction unit 120 may be configured as a telescopic-type extension-retraction mechanism. The top plate 130 is provided at the upper end of the extension-retraction unit 120, and the top plate 130 is raised or lowered by the operation of the extension-retraction unit 120. The extension-retraction unit 120 includes a first drive device 121 such as a motor, and extends and retracts as the first drive device 121 is driven. That is, the top plate 130 is raised or lowered as the first drive device 121 is driven. The first drive device 121 is driven in response to a control signal from the control unit 100. In the transport vehicle 10, any configuration can be applied as long as the top plate 130 can be moved to a desired height.

The transport vehicle 10 may further include a mechanism for horizontally moving the extension-retraction unit 120. In such a case, the top plate 130, which will be described later, may be configured to be accommodated in a rack 170, which will be described later, when the extension-retraction unit 120 is moved in the horizontal direction (for example, the traveling direction of the transport vehicle or the opposite direction thereto) with the top plate 130 lowered.

The top plate 130 includes, for example, a plate member serving as the upper face and a plate member serving as the lower face, and has a space for accommodating the arm 150 between the upper face and the lower face. The shape of the plate members, that is, the shape of the top plate 130 is, for example, a flat disk shape, but may be any other shape. The top plate 130 may be provided with a notch along the line of motion of the arm 150 such that a protrusion 152 of the arm 150 does not hit the top plate 130 when the arm 150 is moved.

The rotation mechanism 140 includes a rotation mechanism that rotates the top plate 130 by a predetermined amount with the vertical direction serving as the rotation axis. The predetermined amount is, for example, 90°. The rotation mechanism 140 may rotate the extension-retraction unit 120 rotatably attached to the transport vehicle 10, or may rotate the top plate 130 attached to the upper end of the extension-retraction unit 120. The rotation mechanism 140 can change the extension direction of the arm 150, which will be described later, by rotating the top plate 130 by the predetermined amount. The rotation mechanism 140 rotates the top plate 130 with a drive device such as a motor.

The arm 150 is attached to the top plate 130 and can be extended and retracted in the horizontal direction. The arm 150 may be moved in and out of the top plate 130. The arm 150 includes a shaft 151 and the protrusion 152. The protrusion 152 extends from the shaft 151 in a different direction from the shaft 151 and engages with the object. The protrusion 152 may extend from the tip of the shaft 151 in the direction perpendicular to the shaft 151. That is, the arm 150 may have an L-shape.

Further, the arm 150 is provided with a second drive device 153 that extends and retracts the arm 150 in the horizontal direction (that is, the direction along the shaft 151, in other words, the longitudinal direction of the arm 150), in response to the control signal received from the control unit 100. The second drive device 153 may further have a function of rotating the arm 150 with the shaft 151 serving as a rotation axis. The second drive device 153 includes, for example, a motor and a linear guide to extend and retract the arm 150, but known mechanisms for performing these operations may be used as the second drive device 153. The extension-retraction mechanism of the arm 150 is not limited to the guide rail mechanism.

The arm 150 is not limited to the structure described above. The arm 150 does not have to be provided inside the top plate 130, and may be attached to the upper side or the lower side of the top plate. Further, the arm 150 may be an extension-retraction arm capable of gripping an object. In such a case, the arm 150 may be attached to the upper side of the top plate 130.

Figure 5:
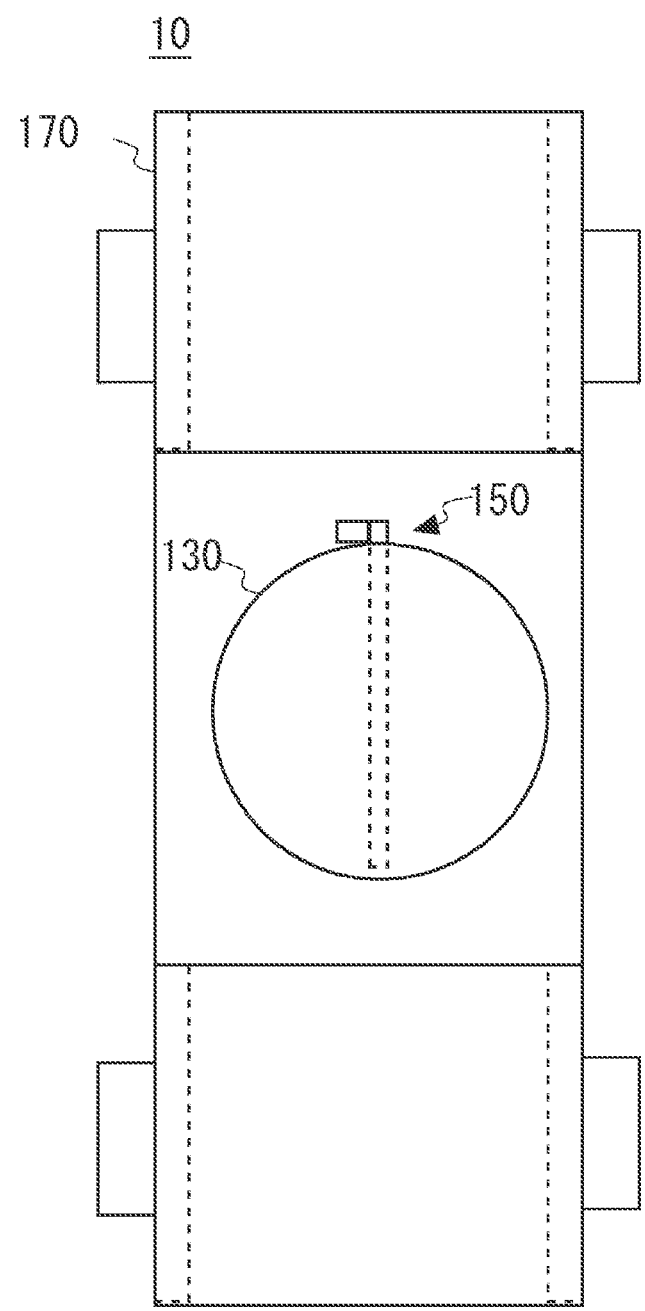
FIG. 5 is a schematic plan view showing a state in which the transport vehicle according to the embodiment has retracted an arm.
Figure 6:
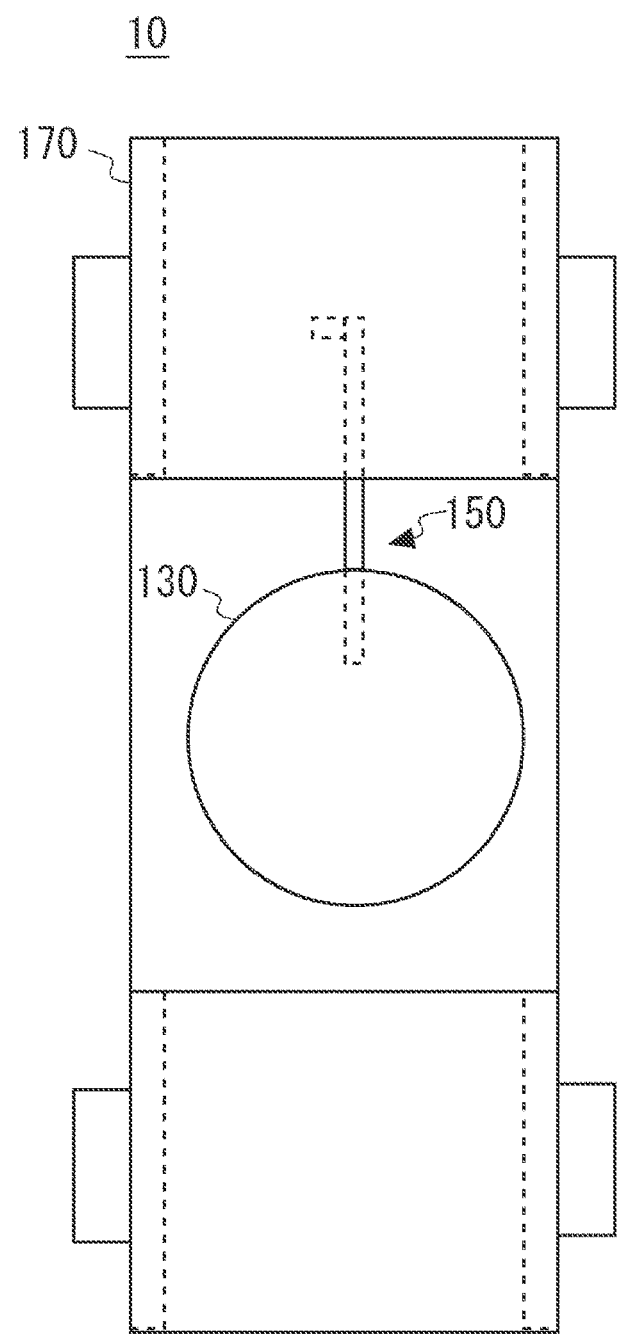
FIG. 6 is a schematic plan view showing a state in which the transport vehicle according to the embodiment has extended the arm.

Here, the movement of the arm 150 is shown in FIG. 5 and FIG. 6. FIG. 5 is a schematic plan view showing the transport vehicle 10 with the arm 150 retracted. FIG. 6 is a schematic plan view showing the transport vehicle 10 with the arm 150 extended.

The wireless communication unit 160 shown in FIG. 4 is a circuit for performing wireless communication to communicate with a server or a robot as needed, and includes, for example, a wireless transmission and reception circuit and an antenna. Note that, when the transport vehicle 10 does not communicate with other devices, the wireless communication unit 160 may be omitted.

The control unit 100 is a device that controls the transport vehicle 10, and includes a processor 1001, a memory 1002, and an interface (IF) 1003. The processor 1001, the memory 1002, and the interface 1003 are connected to each other via a data bus or the like.

The interface 1003 is an input-output circuit used for communicating with other devices such as the moving unit 110, the extension-retraction unit 120, the rotation mechanism 140, the arm 150, and the wireless communication unit 160.

The memory 1002 is composed of, for example, a combination of a volatile memory and a non-volatile memory. The memory 1002 is used to store software (computer program) including one or more commands to be executed by the processor, data used for executing various processes of the transport vehicle 10, and the like.

The processor 1001 may be, for example, a microprocessor, a microprocessor unit (MPU), or a central processing unit (CPU). The processor 1001 may include a plurality of processors. As described above, the control unit 100 is a device that functions as a computer.

The above-mentioned program can be stored and supplied to a computer using various types of non-transitory computer-readable media. The non-transitory computer-readable media include various types of tangible recording media. Examples of the non-transitory computer-readable media include magnetic recording media (e.g. flexible disks, magnetic tapes, hard disk drives), magneto-optical recording media (e.g. magneto-optical disks), compact disc read-only memory (CD-ROM), compact disc recordable (CD-R), compact disc rewritable (CD-R/W), and semiconductor memory (e.g. mask ROM, programmable ROM (PROM), erasable PROM (EPROM), flash ROM, random access memory (RAM)). Further, the program may be supplied to the computer using various types of transitory computer-readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

Next, the control unit 100 will be described. The control unit 100 can control the rotation of each wheel 112 and move the vehicle body 111 to a desired position by transmitting the control signal to each motor 113 of the moving unit 110.

The control unit 100 may control movement of the transport vehicle 10 by executing known control such as feedback control or robust control based on rotation information of the wheels 112 detected by rotation sensors provided for the wheels 112. Further, the control unit 100 may cause the transport vehicle 10 to move autonomously by controlling the moving unit 110 based on distance information detected by a distance sensor such as a camera or an ultrasonic sensor provided for the transport vehicle 10 and map information on moving environment.

Further, the control unit 100 can control the height of the top plate 130 by transmitting the control signal to the first drive device 121 of the extension-retraction unit 120. Further, the control unit 100 can control the rotation angle of the top plate 130 by transmitting the control signal to the rotation mechanism 140. The control unit 100 can control the extension and retraction of the arm 150 in the horizontal direction by transmitting the control signal to the second drive device 153.

With reference to FIGS. 1 to 3, the rack 170 accommodates the objects that are transported by the transport vehicle 10. The rack 170 may be provided at the front and the rear of the transport vehicle 10, or may be provided at either one. The rack 170 is provided with pairs of rails 172 for supporting the objects. When the racks 170 are provided at the front and the rear of the transport vehicle 10, the two racks are arranged such that the top plate 130 is interposed therebetween.

Figure 7:
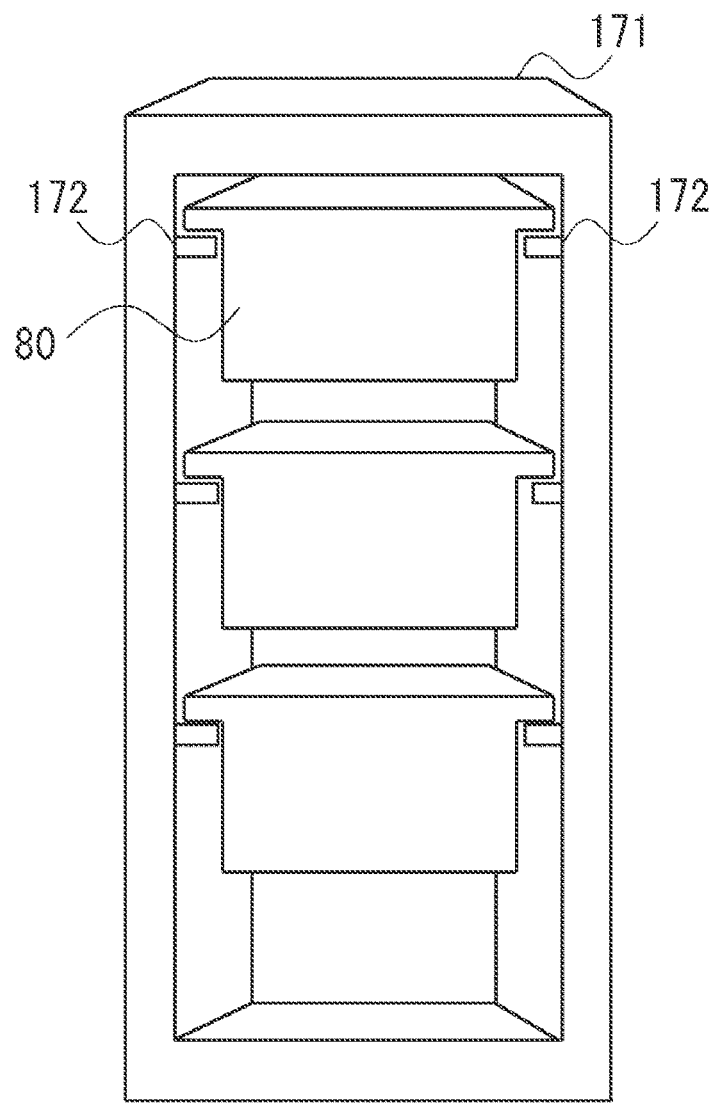
FIG. 7 is a schematic view showing an outline of a rack included in the transport vehicle according to the embodiment.
Figure 8:
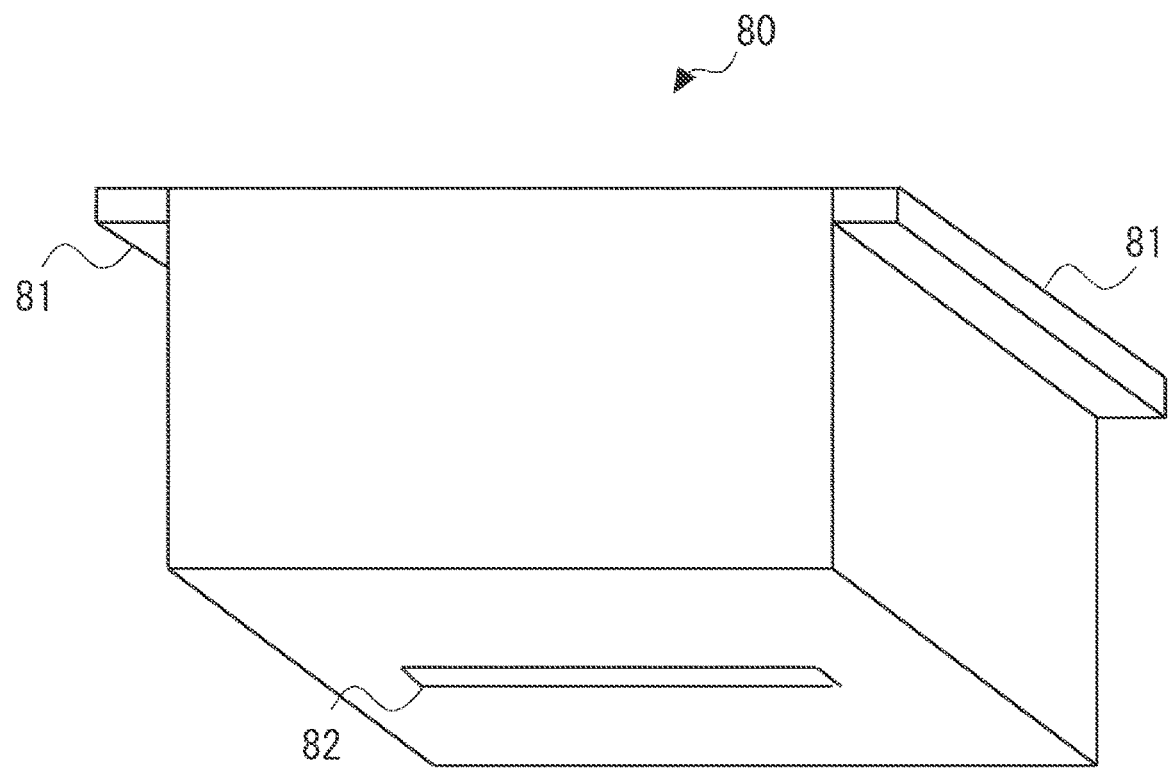
FIG. 8 is a perspective view illustrating the shape of an object that is transported by the transport vehicle according to the embodiment.

FIG. 7 is a schematic view showing the rack 170 included in the transport vehicle 10 and objects 80 accommodated in the rack 170. FIG. 8 is a perspective view showing the front surface, the bottom surface, and the side surface of the object 80.

The rack 170 includes a housing 171 and pairs of rails 172. As described above, the pairs of rails 172 support both sides of the objects 80. Rails of each pair of rails 172 are provided at the same height so as to be parallel with each other. In each of the objects 80 accommodated in the rack 170, one side of the object 80 is supported by one of the rails 172 and the other side is supported by the other of the rails 172. The rails 172 are both provided so as to extend from the front surface to the back surface of the rack 170.

For example, as shown in FIG. 8, a flange 81 is provided on both sides of the object 80. The object 80 is supported in the rack 170 as the flanges 81 are supported by the rails 172 from below. Note that, the flange 81 is provided on both sides of the object 80 so as to extend from the front surface to the back surface. In the example shown in FIG. 8, the flanges 81 are each provided in an upper portion of the side of the object 80. However, the flanges 81 may be provided in a lower portion, for example, and may not necessarily be provided in the upper portion. Further, when the rails 172 support the bottom surface of the object 80, the object 80 does not necessarily have to be provided with the flanges 81.

As described above, in the rack 170, both sides of the object 80 are supported from below by the rails 172. The object 80 can be moved in the front-rear direction in the rack 170 along the rails 172. That is, the object 80 is stored in the rack 170 by pushing the object 80 toward the back surface of the rack 170. Conversely, the object 80 can be taken out from the rack 170 by pulling out the object 80 toward the front of the rack 170.

As shown in FIG. 8, a groove 82 for hooking the protrusion 152 of the arm 150 is provided in the bottom surface of the object 80 at a predetermined position. The groove 82 may have, for example, a semi-cylindrical shape having an axial direction that coincides with the direction of pulling out the object 80. The object 80 is, for example, a rectangular parallelepiped container (box). However, the object 80 is not limited to this and may be any object. The object 80 serving as a container can house any other object. Note that FIG. 8 is merely an example. For example, when the arm 150 grips the object 80, the groove 82 does not have to be provided in the object 80.

Figure 9:
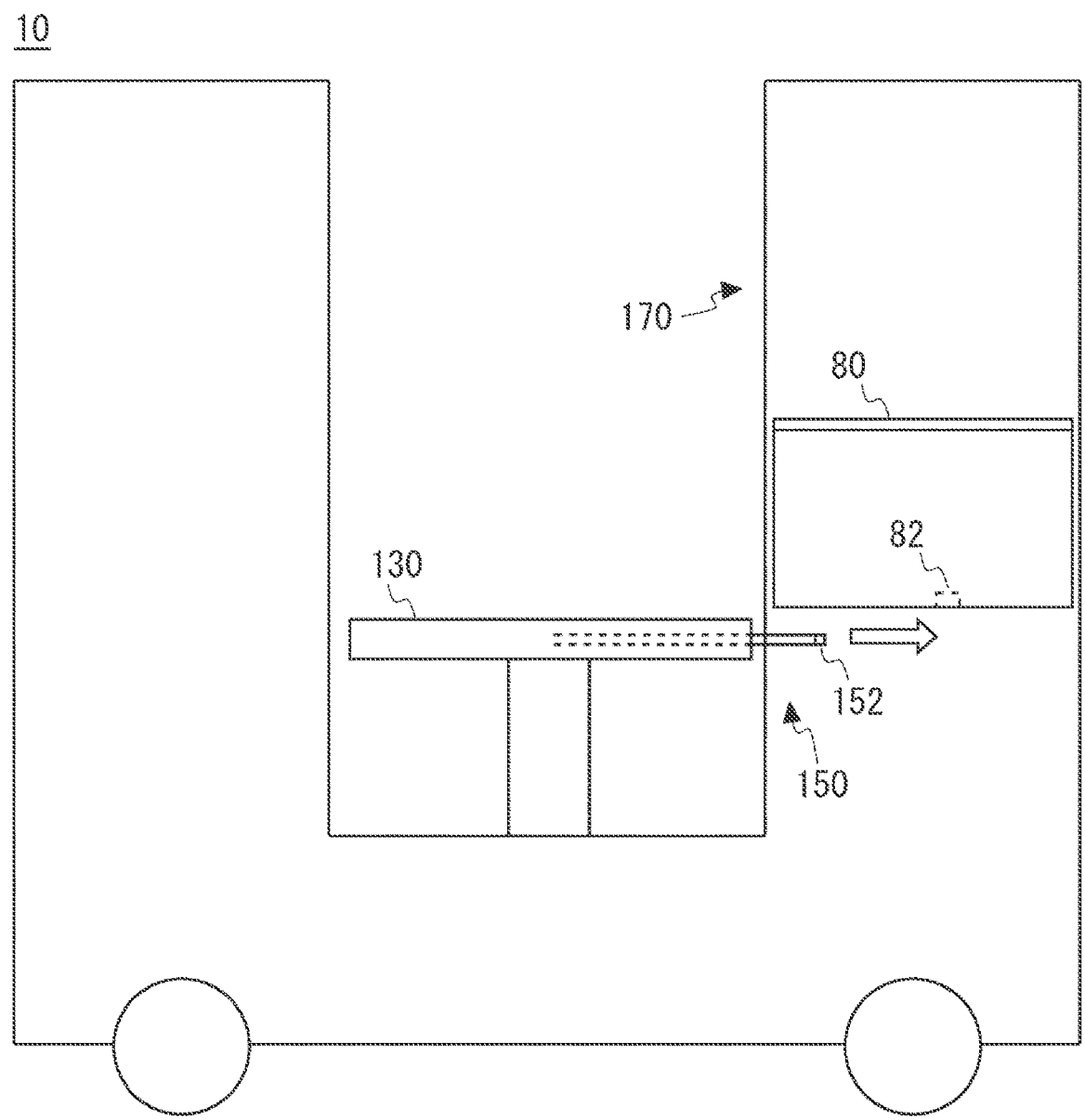
FIG. 9 is a schematic side view showing a state before the transport vehicle according to the embodiment takes out the object from the rack.
Figure 10:
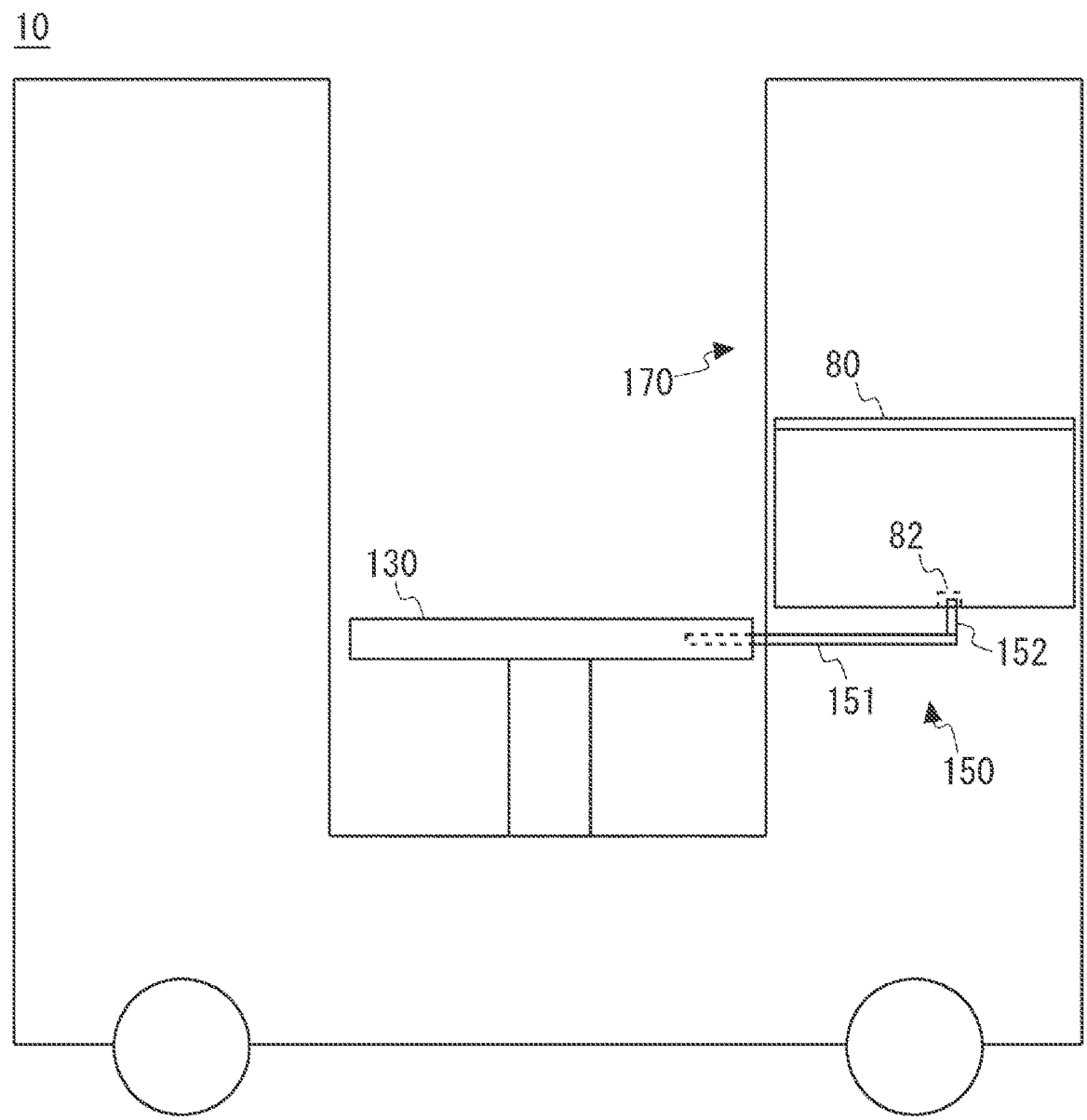
FIG. 10 is a schematic side view showing a state in which an arm of the transport vehicle according to the embodiment is engaged with the object.
Figure 11:
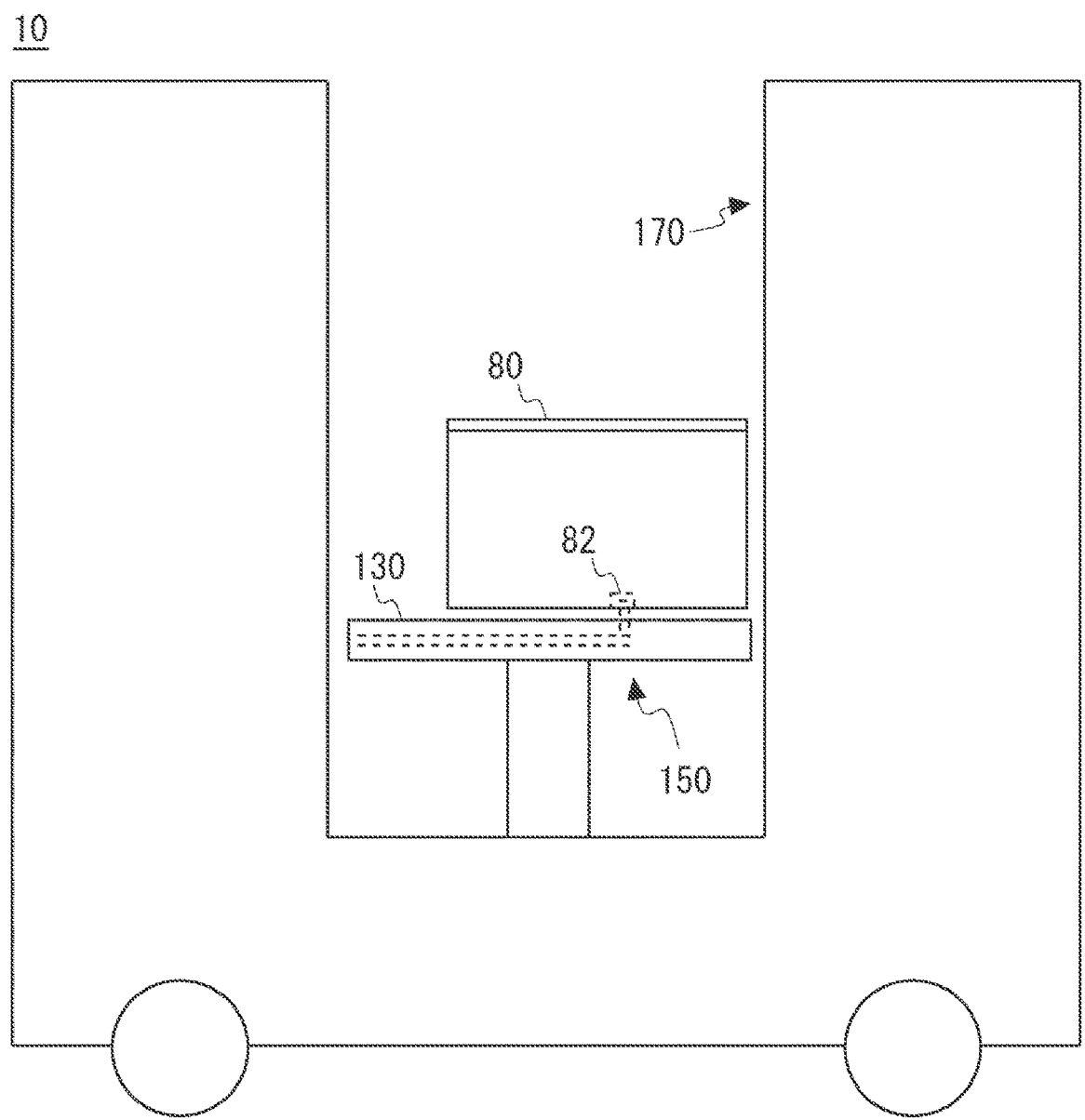
FIG. 11 is a schematic side view showing a state in which the transport vehicle according to the embodiment has placed the object on a top plate.

Next, a method of placing the object 80 stored in the rack 170 on the top plate 130 will be described with reference to FIGS. 9 to 11. The control unit 100 of the transport vehicle 10 moves the object 80 from the rack 170 to the top plate 130 or moves the object 80 from the top plate 130 to the rack 170, by operating the arm 150. FIGS. 9 to 11 are schematic side views of the transport vehicle 10. For the sake of clarity, the object 80 and the arm 150 are indicated by solid lines even when they are hidden in the rack 170. Further, the rails 172 of the racks 170 are not shown.

As shown in FIG. 9, first, the control unit 100 extends the arm 150 by a predetermined length and moves the protrusion 152 of the arm 150 to the groove 82 in the bottom surface of the object 80. The transport vehicle 10 may include a sensor such as a camera that detects the position of the groove 82 of the object 80, and may determine the length to extend the arm 150 based on the detection result by the sensor. At this time, the direction of protrusion of the protrusion 152 may be the horizontal direction.

Next, as shown in FIG. 10, the control unit 100 rotates the protrusion 152 with the shaft 151 of the arm 150 serving as a rotation axis. Specifically, the control unit 100 rotates the protrusion 152 such that the protrusion 152 faces upward. With this operation, the protrusion 152 enters the groove 82 of the object 80. The transport vehicle 10 may extend the arm 150 with the protrusion of the arm 150 facing upward and then raise the top plate 130 to insert the protrusion 152 into the groove 82.

Next, the transport vehicle 10 retracts the arm 150 hooked in the groove 82. As a result, as shown in FIG. 11, the object 80 is pulled out from the rack 170 and moves to the top plate 130.

On the other hand, the control unit 100 inserts into the rack 170 the arm 150 hooked to the groove 82 of the object 80 placed on the top plate 130, that is, extends the arm 150 by a predetermined length with the protrusion 152 inserted in the groove 82, so that the object 80 on the top plate 130 can be stored in the rack 170.

The number of grooves 82 of the object 80 may be one as shown in FIG. 8, but may be more than one. Specifically, the bottom surface of the object 80 may have a plurality of grooves 82 arranged in the moving direction of the object 80. In this case, when the control unit 100 of the transport vehicle 10 moves the object 80 accommodated in the rack 170 to the top plate 130, the control unit 100 may hook the tip of the arm 150 to the grooves 82 sequentially from the groove 82 on the top plate 130 side and perform the pulling-out operation from the rack 170 repeatedly. Similarly, when the control unit 100 of the transport vehicle 10 moves the object 80 on the top plate 130 to the rack 170, the control unit 100 may hook the tip of the arm 150 to the grooves sequentially from the groove 82 on the rack 170 side and perform the pushing-in operation to the rack 170 repeatedly.

Figure 12:
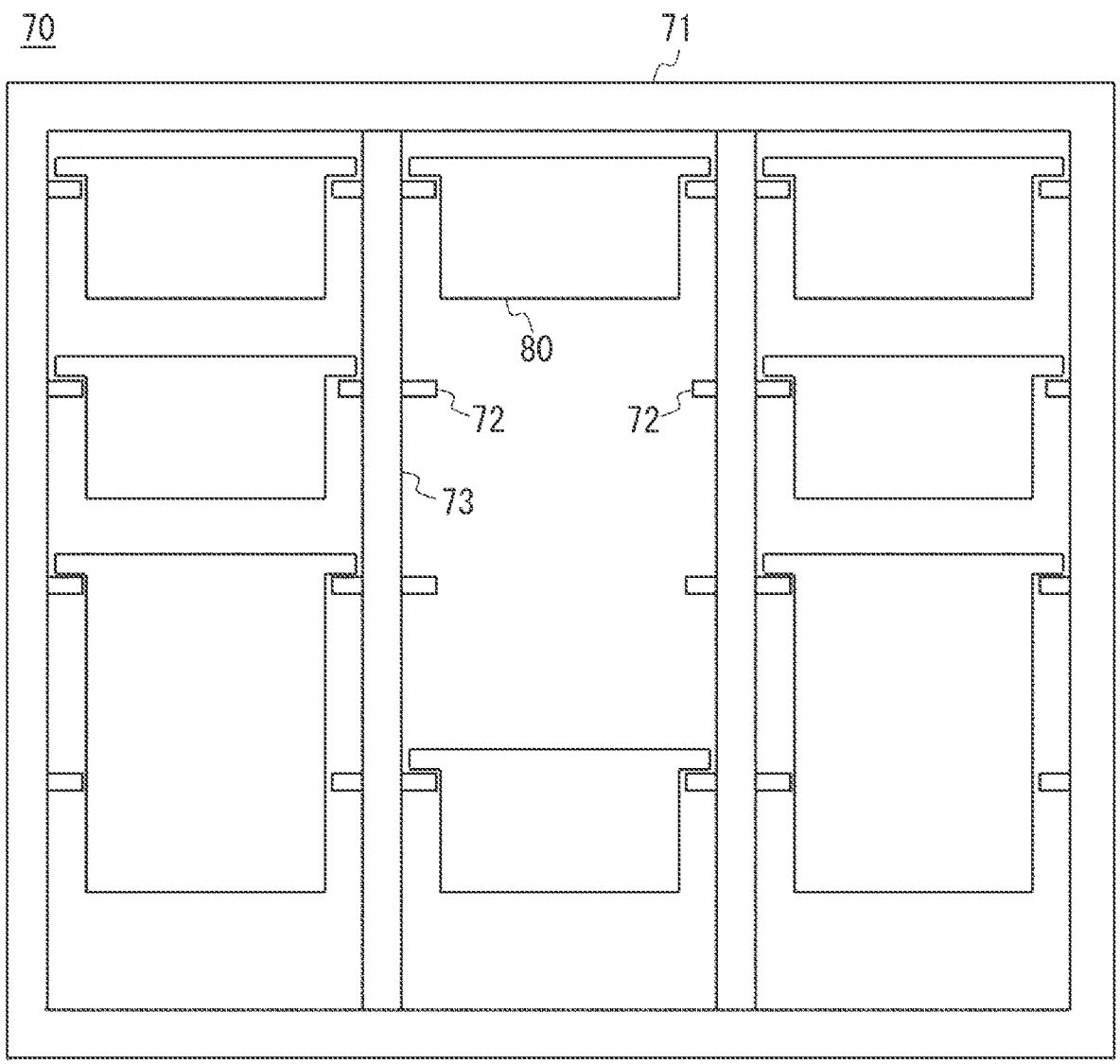
FIG. 12 is a schematic view showing an outline of a rack installed outside the transport vehicle according to the embodiment.

Further, the rack 70 having the same configuration as the rack 170 is installed outside the transport vehicle 10. The transport vehicle 10 can also perform a pull-out operation and a push-in operation with respect to the rack 70 installed outside. FIG. 12 is a schematic front view showing a configuration example of the rack 70 installed outside the transport vehicle 10. The rack 70 may be installed outside or inside a dwelling.

The rack 70 includes a housing 71, pairs of rails 72, and partition plates 73. The housing 71 corresponds to the housing 171 of the rack 170 of the transport vehicle 10. The pairs of rails 72 correspond to the pairs of rails 172 of the rack 170 of the transport vehicle. Therefore, a detailed description will be omitted. In the example of FIG. 12, two partition plates are provided, but the number of partition plates is not limited at all. Further, the partition plates 73 do not have to be provided. As shown in FIG. 12, the rack 70 may be configured to accommodate objects 80 of different sizes. The rack 170 of the transport vehicle 10 may also be configured to accommodate objects 80 of different sizes.

Figure 13:
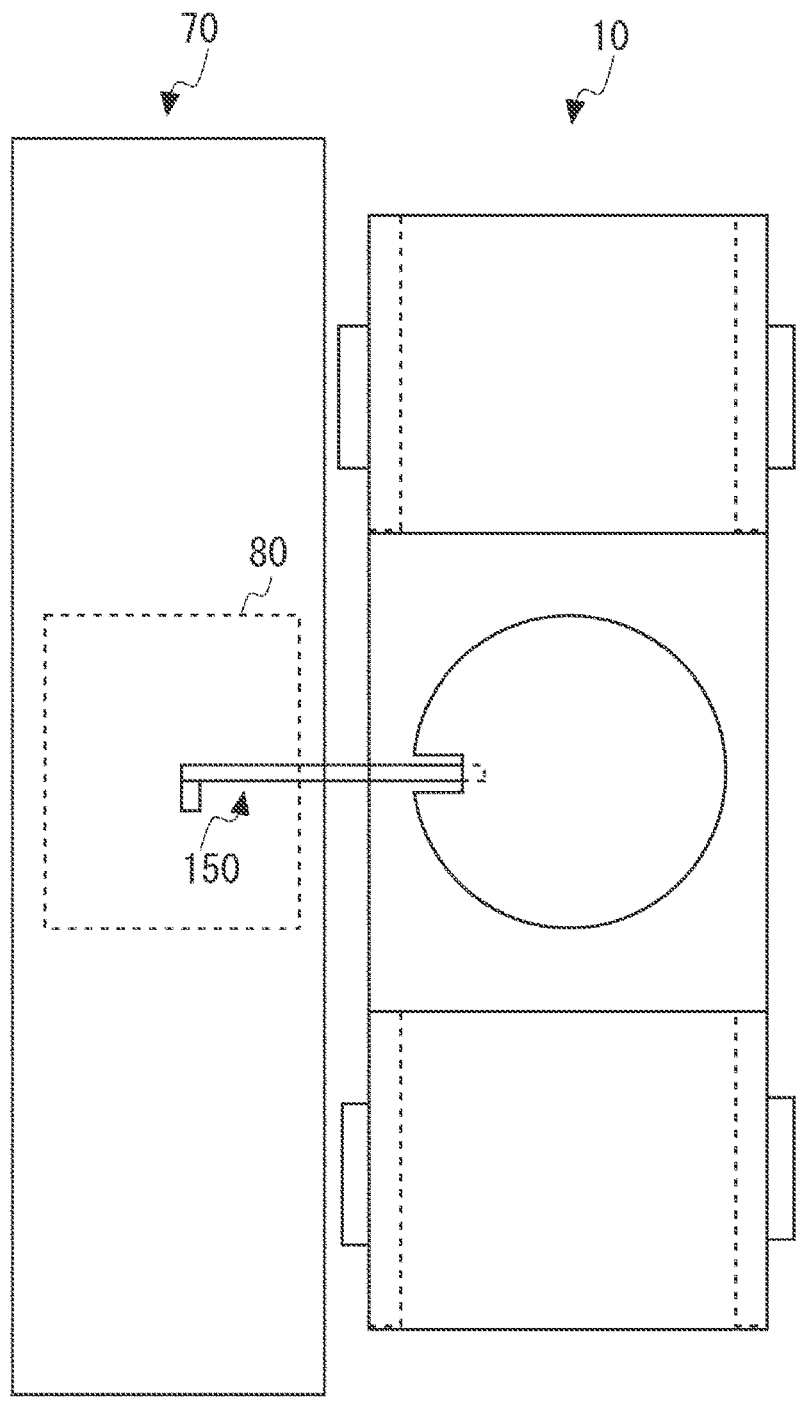
FIG. 13 is a schematic plan view showing a state in which the transport vehicle according to the embodiment has extended the arm toward the rack installed outside the transport vehicle.

The transport vehicle 10 may stop in front of the rack 70 as shown in FIG. 13 when the object 80 is taken in and out of the rack 70. In FIG. 13, the side surface of the transport vehicle 10 and the front surface of the rack 70 face each other. The transport vehicle 10 can extend and retract the arm 150 to pull out the object 80 from the rack 70, and extend the arm to store the object 80 in the rack 70.

Next, a transport method of the object 80 by the transport vehicle 10 will be specifically described with reference to FIGS. 14 to 17. FIGS. 14 to 17 are schematic plan views of the transport vehicle 10 and the rack 70. First, the transport vehicle 10 transports the object 80 accommodated in the rack 170 to the delivery destination. During the transportation, the transport vehicle 10 may travel with the top plate 130 lowered.

Figure 14:
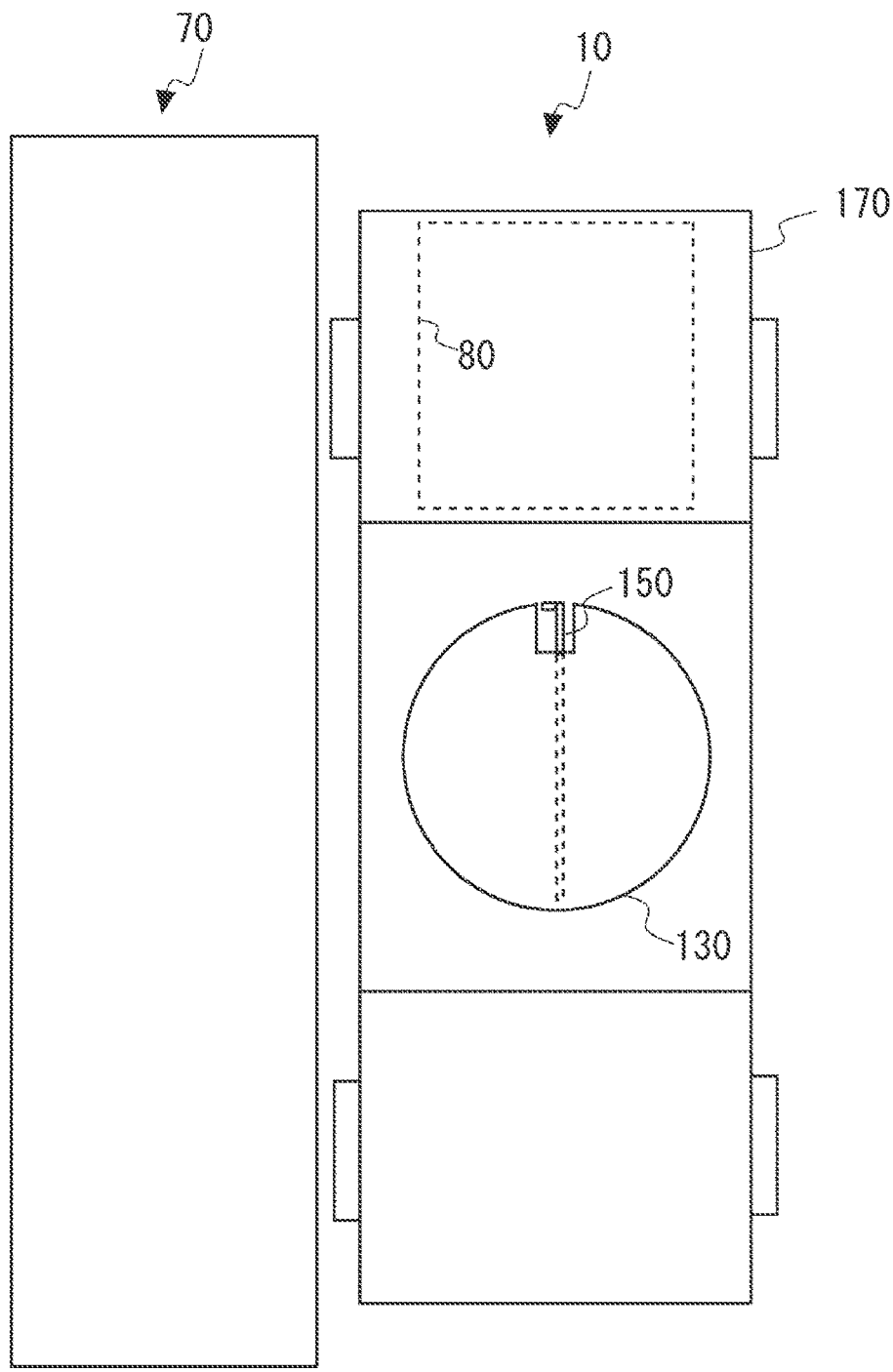
FIG. 14 is a schematic plan view showing a state in which the transport vehicle according to the embodiment is stopped in front of the rack installed outside the transport vehicle.
Figure 15:
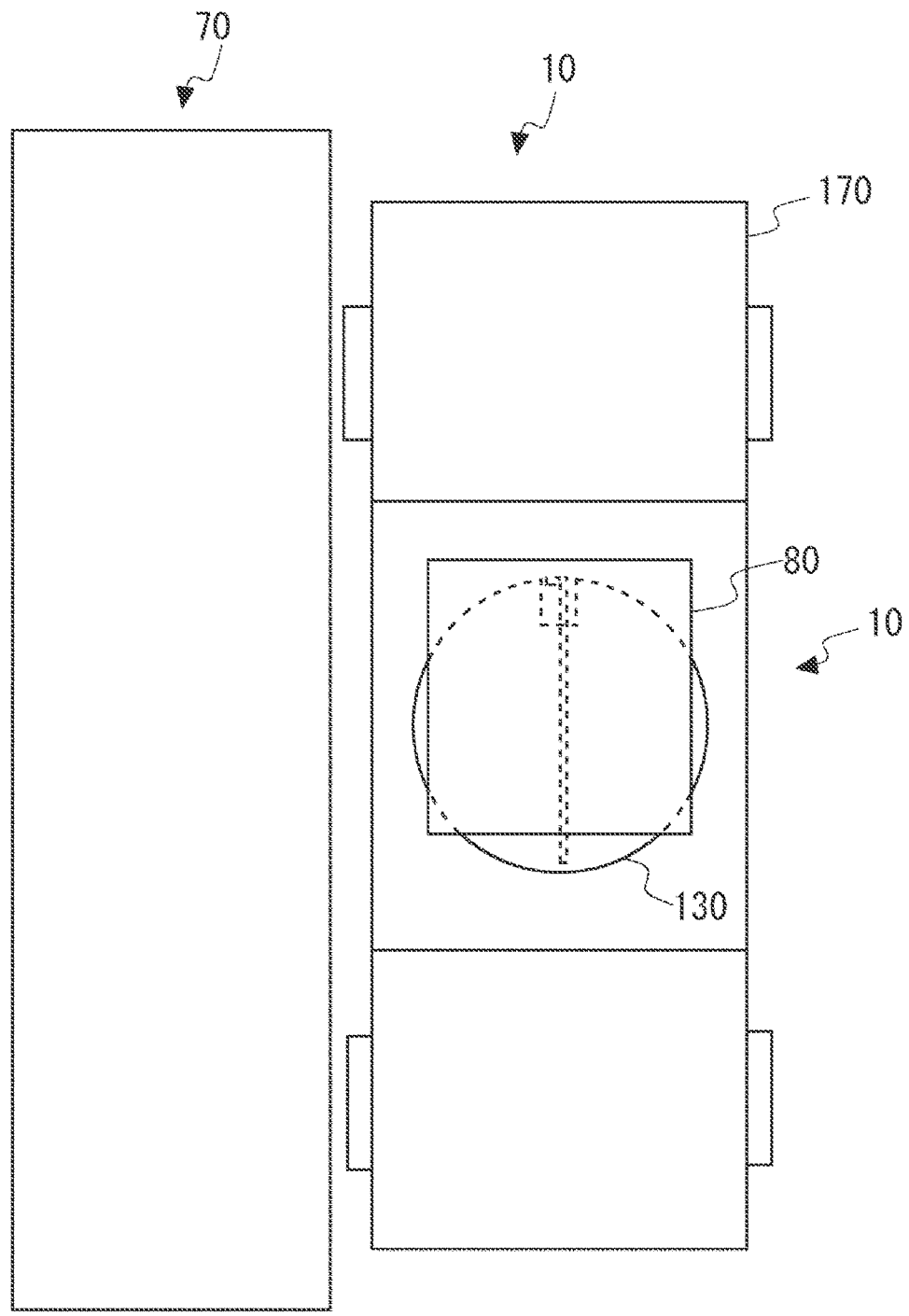
FIG. 15 is a schematic plan view showing a state in which the transport vehicle according to the embodiment has placed the pulled-out object on the top plate.

First, the transport vehicle 10 stops in front of the rack 70 installed at the delivery destination as shown in FIG. 14. Then, the transport vehicle 10 raises the top plate 130 to the position where the object 80 is accommodated, and then extends and retracts the arm 150 to pull out the object 80 from the rack 70. Specifically, the transport vehicle 10 first extends the arm 150 and causes the arm 150 to be engaged with the object 80. Then, the transport vehicle 10 takes out the object 80 from the rack 70 by retracting the arm 150. As a result, the transport vehicle 10 places the object 80 on the top plate 130 (see FIG. 15).

Figure 16:
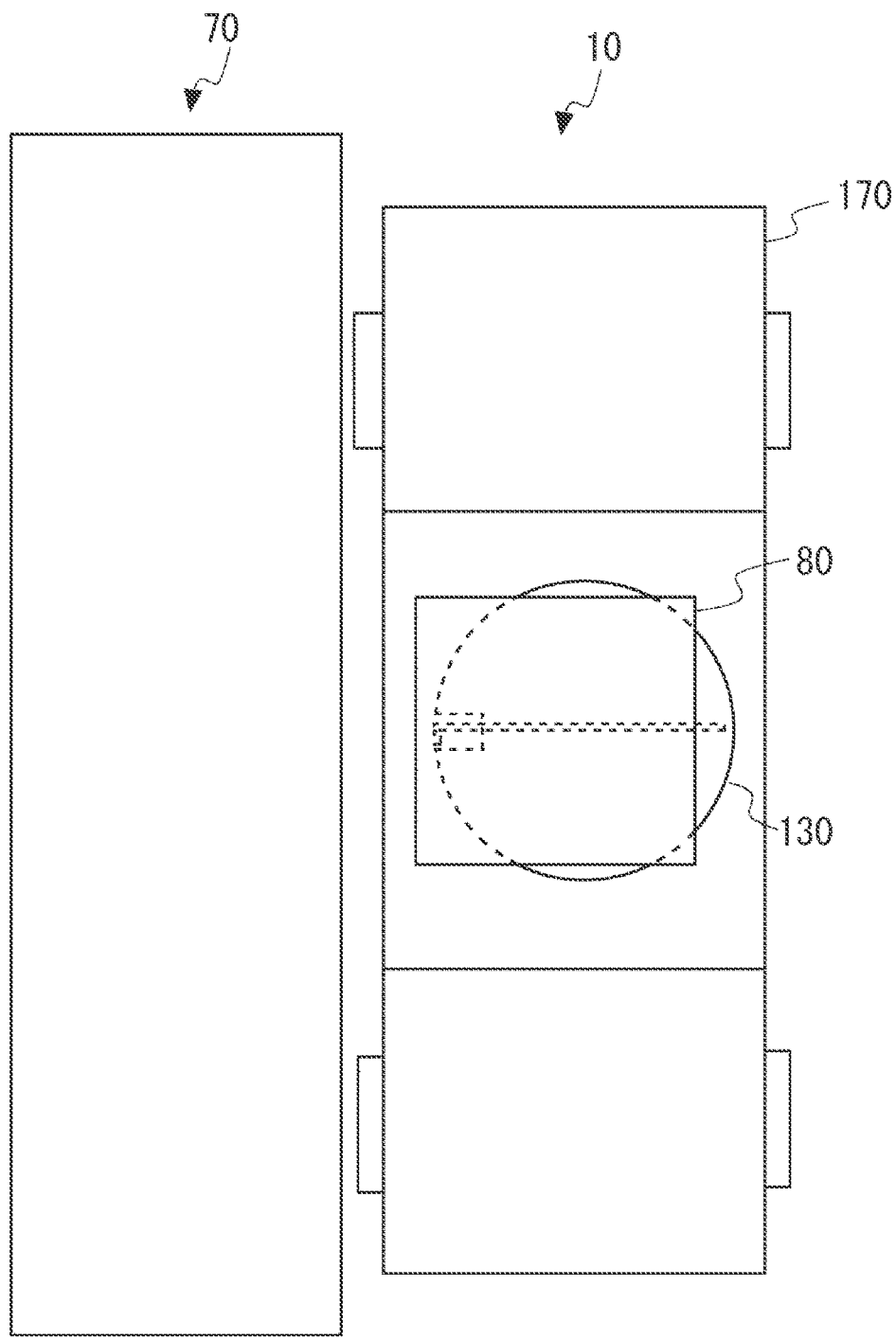
FIG. 16 is a schematic plan view showing a state in which the transport vehicle according to the embodiment has rotated the top plate on which the object is placed by a predetermined amount.
Figure 17:
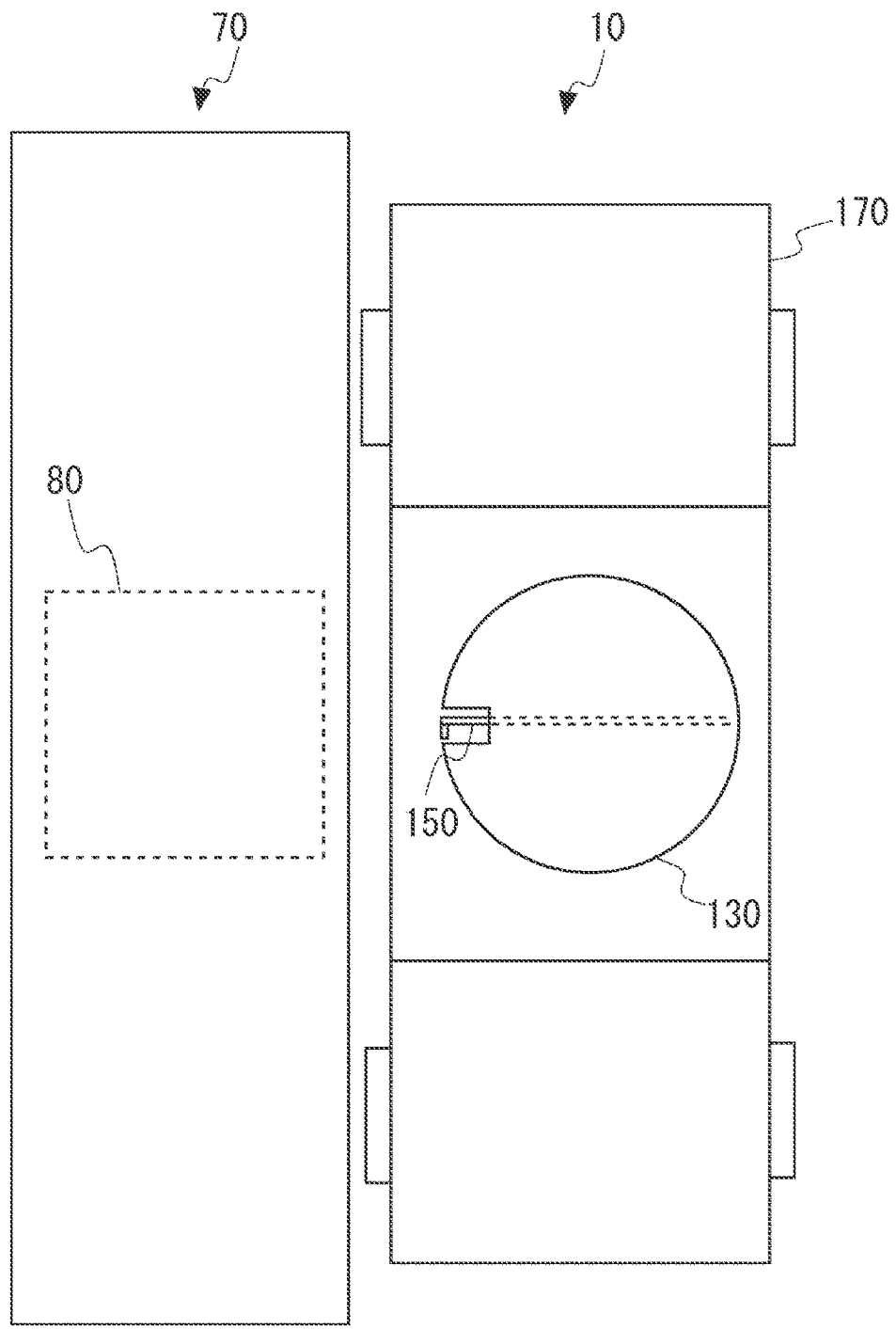
FIG. 17 is a schematic plan view showing a state in which the transport vehicle according to the embodiment has stored the object in the rack installed outside the transport vehicle.

Next, as shown in FIG. 16, the transport vehicle 10 rotates the top plate 130 on which the pulled-out object 80 is placed by 90° around the vertical axis. Thereby, the extension direction of the arm 150 is changed from the direction toward the rack 170 to the direction toward the rack 70. As a result, the transport vehicle 10 can store the object in the rack 70 using the arm 150. Next, the transport vehicle 10 extends the arm 150 to store the object 80 in the rack 70. FIG. 17 shows a state in which the transport vehicle 10 has retracted the arm 150 after storing the object 80 in the rack 70.

Further, the transport vehicle 10 may transfer the object 80 from the rack 70 installed outside to the rack 170 of the transport vehicle 10 by the same procedure. Specifically, the transport vehicle 10 first extends and retracts the arm 150 to pull out the object 80 from the rack 70. Then, the transport vehicle 10 rotates the top plate 130 on which the pulled-out object is placed by a predetermined amount. As a result, the extension direction of the arm 150 becomes the direction toward the rack 170. Finally, the transport vehicle 10 extends the arm 150 to store the object 80 in the rack 170. Then, the transport vehicle 10 delivers the object 80 accommodated in the rack 170 to the delivery destination.

In the above example, the transport vehicle 10 rotates the top plate 130 on which the object 80 is placed by 90°, but the rotation angle of the top plate 130 is not limited to 90°. For example, the transport vehicle 10 may be provided with the rack 170 at either the front or the rear of the vehicle body 111, and in such a case, the transport vehicle 10 can be stopped with the front thereof facing the front surface of the rack 70. The transport vehicle 10 can store the object in the rack 70 installed outside, by rotating the top plate 130 by 180° after placing the object 80 stored in the rack 170 of the transport vehicle 10 on the top plate 130. The same applies when the object 80 is moved from the rack 70 installed outside to the rack 170 installed in the transport vehicle 10.

When the racks 170 are provided at the front and the rear of the vehicle body, the transport vehicle 10 can place the object 80 accommodated in one of the racks 170 on the top plate 130 and rotate the top plate 130 by 180° to store the object 80 to the other of the racks 170. As a result, the transport vehicle 10 can balance the quantity (for example, weight) of the objects 80 accommodated in the front and rear racks 170.

Figure 18:
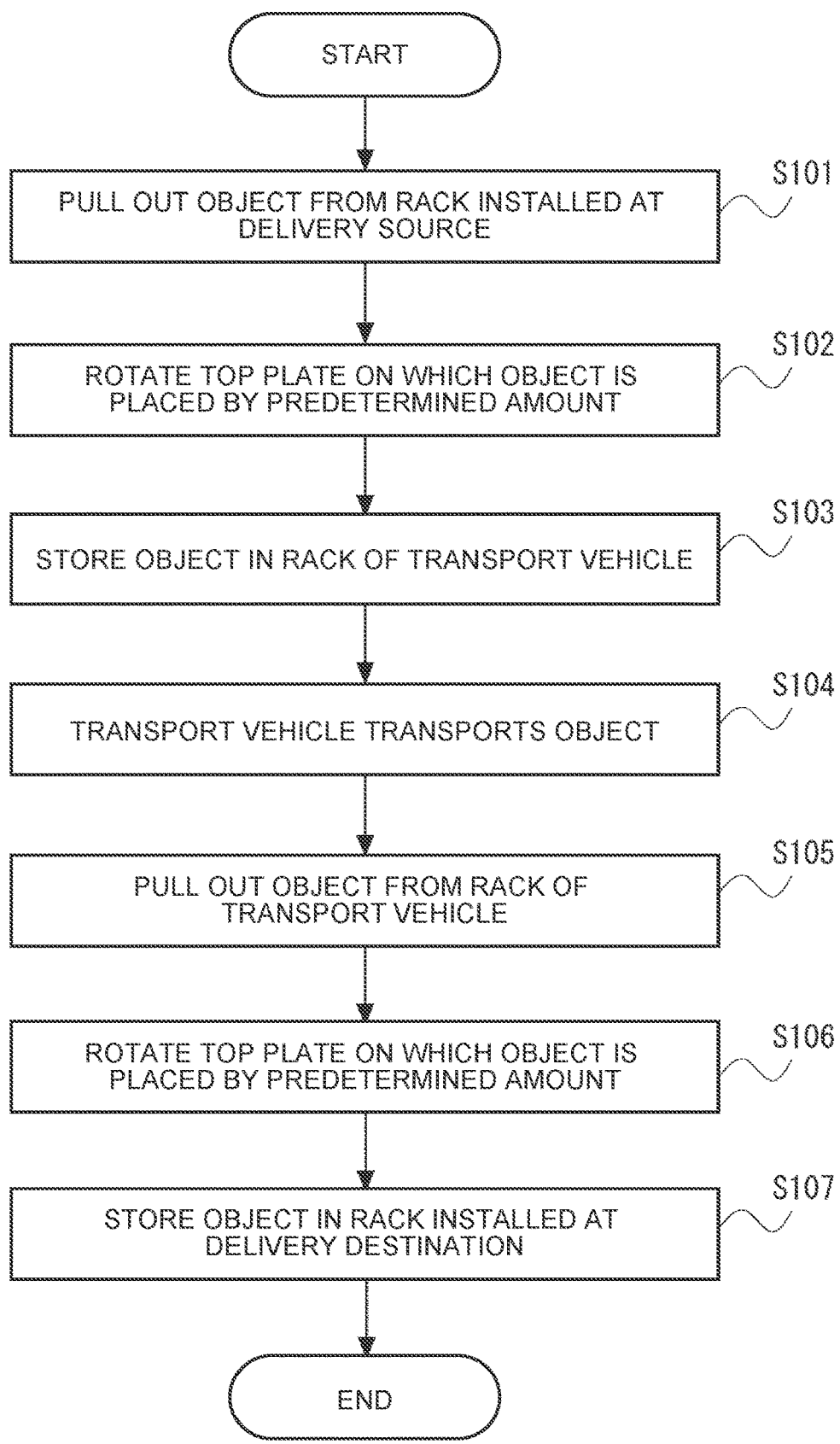
FIG. 18 is a flowchart illustrating a flow of a transport method according to the embodiment.

FIG. 18 is a flowchart illustrating a flow of a transport method according to the embodiment. It is assumed that the transport vehicle 10 is stopped in front of the rack 70 installed at the delivery source. The delivery source may be a warehouse. First, the transport vehicle 10 pulls out the object 80 to be transported from the rack 70 installed at the delivery source (step S101). Then, the transport vehicle 10 rotates the top plate 130 on which the object 80 is placed by a predetermined amount (step S102). Then, the transport vehicle 10 stores the object 80 placed on the top plate 130 in the rack 170 of the transport vehicle 10 (step S103). Then, the transport vehicle 10 transports the object 80 (step S104) and stops in front of the rack 70 installed at the delivery destination. The delivery destination may be a dwelling.

Next, the transport vehicle 10 pulls out the object 80 from the rack 170 of the transport vehicle 10 (step S105). Then, the transport vehicle 10 rotates the top plate 130 on which the object 80 is placed by a predetermined amount (step S106). Finally, the transport vehicle 10 stores the object 80 placed on the top plate 130 in the rack 70 using the arm 150 (step S107).

Hereinafter, the effects of the transport system according to the embodiment will be described. The transport vehicle according to the embodiment includes the arm attached to the top plate, and when the object is moved, the object can be temporarily placed on the top plate. Therefore, the transport system according to the embodiment can reduce the force required for the movement of the object.

When the top plate is raised to a position that is high for the width and the depth of a small transfer robot, there is a risk that the transfer robot may fall or drop the object. The transport vehicle according to the embodiment includes a rack on one side or both sides of the transport robot and the size of the transport vehicle is large, so it is possible to reduce the risk of falling when the top plate is raised. Further, in the transport system according to the embodiment, it is not necessary to use, for transportation, both a vehicle for transporting objects and a smaller transport robot.

The transport vehicle according to the embodiment may be provided with racks on both sides of the top plate. In such a case, the robot (top plate, arm, elevating mechanism, and the like) can be made difficult to see from the outside, so that the feeling of intimidation given to the surroundings can be reduced. Further, when the top plate is accommodated in the rack, such an effect can be further emphasized. In addition, by providing racks on both sides of the top plate, stability can be further improved.

The present disclosure is not limited to the above embodiment, and can be appropriately modified without departing from the spirit.

What is claimed is:

1. A transport system comprising a transport vehicle that transports an object, wherein:
  the transport vehicle includes
    at least one rack configured to accommodate the object,
    a top plate,
    an arm attached to the top plate and configured to extend and retract in a horizontal direction,
    a rotation mechanism that changes an extension direction of the arm by rotating the top plate by a predetermined amount with a vertical direction serving as a rotation axis, and
    a control unit that controls operation of the rotation mechanism and the arm; and
  the control unit
    extends and retracts the arm to pull out the object from the at least one rack or a rack installed outside,
    rotates the top plate on which the object that has been pulled out is placed by a predetermined amount, and
    extends the arm to store the object in the rack installed outside when the object has been pulled out from the at least one rack, and extends the arm to store the object in the at least one rack when the object has been pulled out from the rack installed outside.

2. The transport system according to claim 1, wherein:
  the transport vehicle is provided with two racks as the at least one rack; and
  the two racks are arranged such that the top plate is interposed between the two racks.

3. The transport system according to claim 2, wherein the control unit rotates the top plate on which the object that has been pulled out is placed by 90°.

4. The transport system according to claim 1, wherein:
  the transport vehicle further includes an elevating mechanism for raising and lowering the top plate; and
  the control unit further controls the elevating mechanism.

5. The transport system according to claim 4, wherein:
  the transport vehicle further includes a mechanism for horizontally moving the elevating mechanism; and
  the top plate is configured to be accommodated in the at least one rack when the elevating mechanism is moved horizontally with the top plate lowered.

6. A transport method in which a transport vehicle transports an object, the transport vehicle including
  at least one rack configured to accommodate the object,
  a top plate,
  an arm attached to the top plate and configured to extend and retract in a horizontal direction, and
  a rotation mechanism that changes an extension direction of the arm by rotating the top plate by a predetermined amount with a vertical direction serving as a rotation axis, the transport method comprising:
  a step of extending and retracting the arm to pull out the object from the at least one rack or a rack installed outside;
  a step of rotating the top plate on which the object that has been pulled out is placed by a predetermined amount; and
  a step of extending the arm to store the object in the rack installed outside when the object has been pulled out from the at least one rack and extending the arm to store the object in the at least one rack when the object has been pulled out from the rack installed outside.

7. The transport method according to claim 6, wherein:
  the transport vehicle is provided with two racks as the at least one rack; and
  the two racks are arranged such that the top plate is interposed between the two racks.

* * * * *